(12) United States Patent
Vuong

(10) Patent No.: US 6,377,713 B1
(45) Date of Patent: Apr. 23, 2002

(54) SYNCHRONOUS DRAM BANDWIDTH OPTIMIZATION FOR DISPLAY DOWNSIZING OF AN MPEG-2 IMAGE

(75) Inventor: Bao Vuong, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/238,951

(22) Filed: Jan. 27, 1999

(51) Int. Cl.$^7$ .................................................. G06K 9/32
(52) U.S. Cl. ........................ 382/299; 348/567; 348/581; 382/305
(58) Field of Search .................................. 382/298, 299, 382/232, 233, 268, 260, 305, 307; 348/421, 420, 384, 408, 14.13, 416, 581, 714, 716, 441, 567, 566, 568, 565; 375/240.01–204.29, 240, 240.25; 345/127, 129, 130, 202, 203, 439, 507, 509

(56) References Cited

U.S. PATENT DOCUMENTS

| 5,315,388 A | 5/1994 | Shen et al. ................ 348/718 |
| 5,386,212 A | 1/1995 | Shen et al. .................. 341/67 |
| 5,638,128 A | 6/1997 | Hoogenboom et al. ..... 348/416 |
| 5,675,387 A | 10/1997 | Hoogenboom et al. ..... 348/416 |
| 5,844,541 A | * 12/1998 | Cahill, III ................... 345/667 |

* cited by examiner

Primary Examiner—Timothy M. Johnson
(74) Attorney, Agent, or Firm—Barry R. Lipsitz

(57) ABSTRACT

A method and apparatus for downsizing a digital video image, such as an image corresponding to the MPEG-2 standard. The system is particularly suitable for providing a reduced image for a picture-in-picture mode on a television. Digital video pixel data that is received from a channel is decompressed to provide pixel data of an original image (e.g., A1, A2, A3, A4). Horizontally adjacent pixel pairs of the original image are averaged to provide horizontally downsized pixel data (e.g., (A1+A2)/2, (A3+A4)/2), which is stored in a first bank of a multi-bank memory. Data from every other pixel of the original image (e.g., A2, A4) is stored in a second bank of the dual-bank memory. To obtain a downsized image, vertically adjacent lines of the horizontally downsized pixel data are retrieved from the first bank, and averaged to provide vertically and horizontally downsized pixel data for display. Alternatively, to recover pixel data corresponding to the original image for decompressing predictive-coded images, portions of the horizontally downsized pixel data may be retrieved from the first bank with corresponding portions of the data from the second bank (e.g., A1=2(A1+A2)/2−A2).

18 Claims, 5 Drawing Sheets

100

| | | | | | | |
|---|---|---|---|---|---|---|
| L1 → | A1 | A2 | A3 | A4 | A5 | A6 |
| L2 → | A7 | A8 | A9 | A10 | A11 | A12 |
| L3 → | A13 | A14 | A15 | A16 | A17 | A18 |
| L4 → | A19 | A20 | A21 | A22 | A23 | A24 |

| | | | |
|---|---|---|---|
| L1' → | $\underline{A1+A2}\atop 2$ | $\underline{A3+A4}\atop 2$ | $\underline{A5+A6}\atop 2$ |
| L2' → | $\underline{A7+A8}\atop 2$ | $\underline{A9+A10}\atop 2$ | $\underline{A11+A12}\atop 2$ |
| L3' → | $\underline{A13+A14}\atop 2$ | $\underline{A15+A16}\atop 2$ | $\underline{A17+A18}\atop 2$ |
| L4' → | $\underline{A19+A20}\atop 2$ | $\underline{A21+A22}\atop 2$ | $\underline{A23+A24}\atop 2$ |

FIG.1(b)

SYNCHRONOUS DRAM BANDWIDTH OPTIMIZATION FOR DISPLAY DOWNSIZING OF AN MPEG-2 IMAGE

BACKGROUND OF THE INVENTION

The present invention relates to a method and apparatus for downsizing a digital video image, such as an image corresponding to the MPEG-2 standard. The invention is particularly suitable for providing a reduced image for a picture-in-picture mode on a television.

The transmission of digital video data via broadband communication systems such as cable television or satellite television networks has become increasingly popular. Digital decoders, e.g. set-top boxes, are provided in consumers' homes for use in receiving the digital video signals and processing the signals in a format that is suitable for display on a television, video display terminal, or the like. However, the processing and memory storage requirements of such set-top boxes is significant and must be kept as low as possible in order to maintain the commercial feasibility of the network.

In particular, in many cases it is desirable to provide a capability for converting a full size digital video image, e.g., 720×480 (NTSC) or 720×576 (PAL) pixels, to a smaller display image. This feature is required for applications such as picture-in-picture mode, where the downsized image from one program is displayed as an overlay to the image from a second program, or for a program guide display mode, where a reduced display image is provided alongside a program schedule, menu or the like.

However, conventional configurations do not allow for image downsizing since there is no additional memory space available to store averaged pixel values. Generally, with the complexity for performing MPEG video decompression and full sized display, there is no Dynamic Random Access Memory (DRAM) bandwidth available to perform additional display downsizing, e.g., using a 54 MHz Synchronous DRAM (SDRAM), and a sixteen bit wide data bus. This bandwidth problem can be addressed theoretically, e.g., by increasing the SDRAM speed from 54 MHz to 81 MHz or higher. However, this can wreak havoc on the system due to the higher speed congestion of the SDRAM data bus, the additional cost of the required premium memory part, and the general difficulty of high speed design.

Accordingly, it would be desirable to provide a method and apparatus for display downsizing which can be implemented without additional processing speed or memory usage requirements. The system should have the capability to provide a full sized, upsized, or a downsized image as required. The system should be compatible with MPEG-2 or other digital video standards. In a particular embodiment, the system should provide an architecture and methodology which uses only a 16 Mbit SDRAM at 54 MHz, and a 16-bit wide data bus.

The system should take advantage of an existing on-chip memory such as a line buffer or register file which is otherwise not used during downsizing.

The system should be compatible with field mode (e.g., interlaced scan) and frame mode (e.g., progressive scan) video.

The present invention provides a system having the above and other advantages.

SUMMARY OF THE INVENTION

The present invention relates to a method and apparatus for downsizing a digital video image, such as an image corresponding to the MPEG-2 standard.

A method for processing digital video data to display a downsized image thereof, includes the steps of: decompressing compressed digital video pixel data that is received from a channel to provide pixel data of an original image; averaging horizontally adjacent pixel pairs of at least a portion of the original image to provide horizontally downsized pixel data; storing the horizontally downsized pixel data in a first bank of a memory; and storing data from every other pixel of the at least a portion of the original image in a second bank of the memory. A two-tap filter may be used to average the horizontally adjacent pixel pairs.

The memory may be a dual-bank or other multi-bank memory, for example.

A horizontally and vertically downsized image can be obtained by retrieving the horizontally downsized pixel data, and averaging the corresponding vertically adjacent data from every other pixel just prior to display. The vertical averaging can be achieved by providing the horizontally downsized pixel data from the first bank to a line buffer, pixel-by-pixel. The line buffer should be sized to store at least the pixels from one line of the horizontally downsized pixel data, plus one pixel. With this arrangement, successive vertically adjacent pixel pairs will be available in the line buffer for output to, and averaging by, an averaging circuit. The pixel pair is averaged just prior to display.

Moreover, pixel data of the original image can be recovered by retrieving both the horizontally downsized pixel data and the data from every other pixel, and performing simple arithmetic calculations. Specifically, a difference is calculated between (a) twice a value of the respective retrieved portions, and (b) a value of the respective retrieved corresponding portions, to recover pixel data corresponding to the original image. It is desirable to recover pixel data corresponding to the original image for decompressing predictive-coded images.

The method includes the further steps of: retrieving vertically adjacent lines of the horizontally downsized pixel data from the first bank; and averaging the lines to provide vertically and horizontally downsized pixel data for display. For example, a two-tap filter may be used to average the pixel data in the vertically adjacent lines.

The method includes the further steps of: retrieving portions of the horizontally downsized pixel data from the first bank; retrieving corresponding portions of the data from every other pixel from the second bank; and processing the retrieved portions and the retrieved corresponding portions to recover pixel data of the original image. This may be achieved using adder circuitry.

The method includes the further step of: providing the recovered pixel data of the original image for use in the decompressing step. For example, the recovered pixel data may represent a past or future image used for temporal (e.g., inter-frame) prediction of the current, original image. In this case, the recovered pixel data is required for motion compensation and/or estimation. This step is not needed if the current, original image is an intra-frame coded image.

Additionally, B-picture data is not used as a reference picture for motion compensation and/or estimation, so, for this type of data, it is sufficient to store only the horizontally averaged pixel data but not the data from every other pixel of the original image. For I- and P-pictures, both the horizontally averaged pixel data and the data from every other pixel of the original image should be stored.

The memory may be an SDRAM, for example, although the invention may be used with virtually any type of multi-bank memory which is available presently or in the future.

Furthermore, the storing of the horizontally downsized pixel data and the data from every other pixel should occur no later than after one-half of the original image has been decoded to avoid having the decoding catch up to the displaying of the pixel data, in which case the display of data is impaired.

For field mode video, pixel data from each field is processed separately.

A corresponding apparatus is presented.

BRIEF DESCRIPTION OF THE DRAWINGS

FIG. 1(a) illustrates an example video image prior to downsizing.

FIG. 1(b) illustrates the image of FIG. 1(a) after horizontal downsizing.

DETAILED DESCRIPTION OF THE INVENTION

The present invention relates to a method and apparatus for downsizing a digital video image, such as an image corresponding to the MPEG-2 standard.

In a digital video decoder, such as one using an MPEG decompression engine, memory may be arranged in two banks. With one possible approach, after the digital video image has been reconstructed using conventional decoding steps, including motion estimation and compensation, pairs of pixel data may be stored alternatingly in the two banks. For example, assuming the pixels in a video line are represented, from left to right, as A1, A2, A3, A4, A5, A6, A7, A8, A9, A10, . . . , A1 and A2 may be stored in memory bank 1, then A3 and A4 may be stored in bank 2, A5 and A6 may be stored in bank 1, then A7 and A8 may be stored in bank 2, then A9 and A10 may be stored in bank 1, and so forth. However, an improved approach is discussed below.

Typically, the memory is a SDRAM with internal dual-bank memory, and each pixel is represented by an eight-bit value. By switching between bank 1 and bank 2 of the SDRAM, a 54 MHz data rate (two pixels, or sixteen bits per column read) can be used.

Synchronous DRAM is organized in dual-banks to achieve high speed data transfer rates. Switching from one bank to another within the same row and column addresses does not cost any memory bandwidth. In an example embodiment, the present invention provides a memory storage scheme with an SDRAM running at a 54 MHz, which is a typical speed requirement for MPEG-2 video decompression.

The MPEG decoding process can be broken down into several smaller processes, each of which requires DRAM access to function. These processes are (1) prediction calculation, (2) display processing, (3) packet processing, and (4) video syntax parsing. The emphasis of the present invention is on the prediction calculation and the display processing. For display downsizing, the present invention uses a data rate of 54 MHz to effectively perform pixel averaging in both the horizontal and vertical directions. By arranging the data in the two banks as discussed herein, this data rate can be achieved.

Figure 1C:
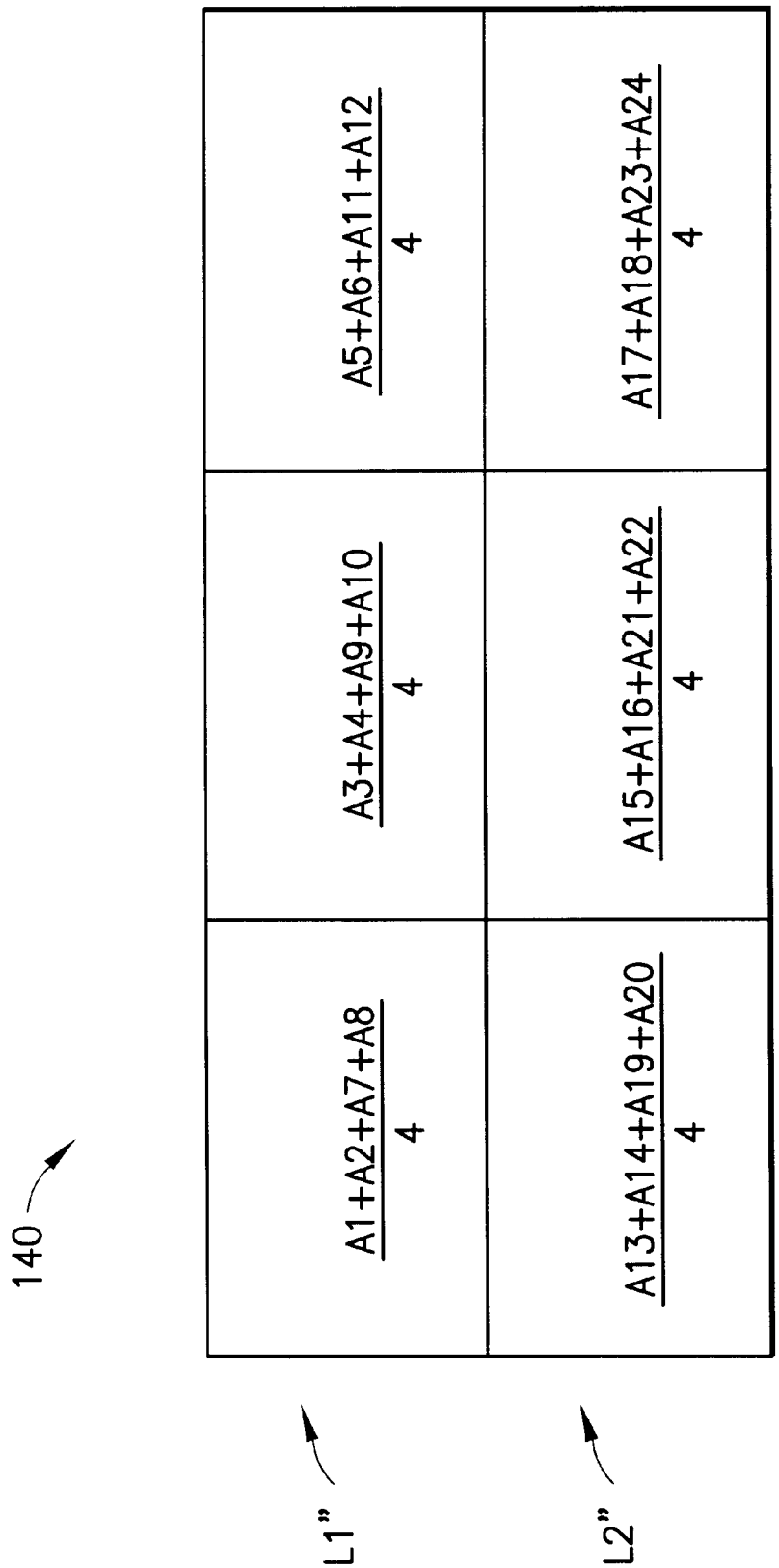
FIG. 1(c) illustrates the image of FIG. 1(a) after horizontal and vertical downsizing.

An example of the image downsizing process is illustrated in FIGS. 1(a) through 1(c). It will be understood that this is a simplified example since an original image having only 6 columns and 4 rows (e.g., 6×4 pixels) is shown. As mentioned previously, a full sized image typically comprises 720 pixels×480 lines (NTSC format) or 720 pixels×576 lines (PAL format). The original video image, shown generally at 100, includes four lines of pixel data, L1, L2, L3 and L4. For example, L1 includes pixels A1–A6, L2 includes pixels A7–A12, L3 includes pixels A13–A18, and L4 includes pixels A19–A24.

FIG. 1(b) illustrates the image of FIG. 1(a) after horizontal downsizing. The horizontally downsized image, shown generally at 120, includes the pixel lines L1', L2', L3' and L4'. Here, the image 100 of FIG. 1(a) is horizontally downsized by a factor of 2 to 1, resulting in the 3×4 image 120. Essentially, horizontal downsizing is achieved by taking the average of horizontally adjacent pixel pairs. For example, the first pixel in line L1' is the average of the pixel values A1 and A2. The second pixel in line L1' is the average of pixel values A3 and A4, and so forth.

FIG. 1(c) illustrates the image of FIG. 1(a) after horizontal and vertical downsizing. The horizontally and vertically downsized image, shown generally at 140, includes a line L1" and a line L2". Here, each downsized pixel value is obtained by taking the average of four neighboring pixels from the original image 100 of FIG 1(a), or by taking the average of vertically adjacent pixel pairs of the horizontally downsized image 120 of FIG. 1(b). For example, the first pixel in line L1" corresponds to the average of pixel values A1, A2, A7, and A8. Here, vertical downsizing in a ratio of 2 to 1 has occurred. Thus, the original full sized 6×4 image 100 of FIG. 1(a) has been downsampled to provide the 3×2 image 140 of FIG. 1(c).

Optionally, downsizing in other ratios, e.g., 3:1 or 4:1, can be derived from 2:1 downsizing. For example, two 2:1 downsized pixels can yield one 4:1 downsized pixel (e.g., $Y1=(1/2)((A1+A2)/2+(A3+A4)/2))$. Similarly, three 2:1 downsized pixels can yield two 3:1 downsized pixels (e.g., $Y1=5/8(A1+A2)/2+3/8(A3+A4)/2$, $Y2=3/8(A3+A4)/2+5/8(A5+A6)/2)$.

Additionally, different downsizing ratios may be used in the horizontal and vertical directions.

Figure 2:
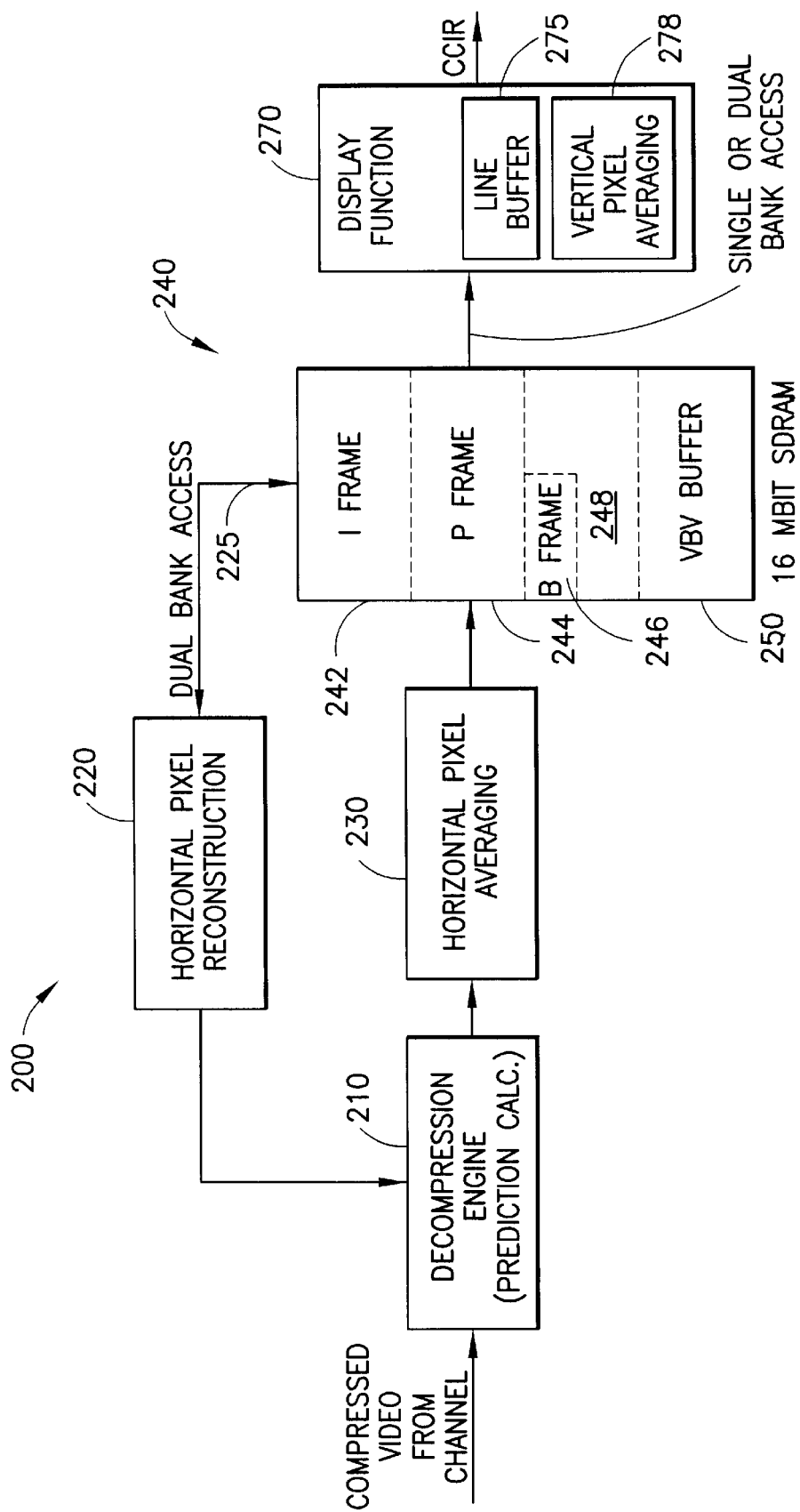
FIG. 2 illustrates a digital video decoder with display downsizing in accordance with the present invention.

FIG. 2 illustrates a digital video decoder with display downsizing in accordance with the present invention. A decoder, shown generally at 200, receives compressed digital video data from a channel, such as a broadband communication network. Typically, a cable or a satellite television network is used.

The decoder 200 includes a decompression engine 210, which performs prediction calculations, e.g., for motion compensation and motion estimation. The output of the decompression engine 210 is a full sized image. A horizontal pixel averaging function 230 receives the pixel data from the full sized image, and performs horizontal averaging by taking the average of adjacent pixel pairs in each line of the image. For example, referring again to the image 100 of FIG. 1(a), the horizontal pixel averaging function 230 would receive pixels A1–A6 of line 1, and would output the pixel values corresponding to line L1' in image 120 of FIG. 1(b).

The horizontally averaged data is then provided for storage in the dual-bank memory 240, which may be a 16 Mbit SDRAM, for example. The memory 240 includes a memory space 242 for storing I-frame (intra-coded frame) data, a memory space 244 for storing P frame data, a memory space 248 for storing B-frame data, and a memory space 250 for providing a Video Buffer Verifier (VBV) buffer. Only a portion 246 of the memory space 248 may be used at a given time for the current B-frame data. The portion that is not used for the current B-frame data may be used for storing data from the next B-frame.

A horizontal pixel reconstruction function 220 can access the memory 240 via a dual-bank access path 225 to recover pixel data corresponding to the original image pixels for use by the decompression engine.

In accordance with the present invention, the horizontal pixel averaging function 230 provides averaged pixel data for storage in a first bank of the memory 240, and non-averaged pixel data for storage in the second bank of the memory 240. This is described in more detail in connection with FIG. 3, below. For pixel data from pictures which do not need the capability to be restored to their original state, such as B-pictures, which are not used in motion compensation or estimation, the non-averaged pixel data need not be stored in the second bank of the memory 240. This data only needs to be stored in the first bank of the memory 240.

Pixel data from I- and P-pictures, which are used in motion compensation or estimation should be stored in both banks of the memory 240.

The horizontal pixel reconstruction function 220 can access either of the banks of the memory 240 to recover data corresponding to the non-averaged pixel data that was originally provided by the decompression engine 210. In this way, pixel data from images which temporarily precede and/or follow a current image, in display order, can be accessed by the decompression engine 210 for use in conventional motion compensation and estimation decompression processing.

The memory 240 provides pixel data to a display function 270, including a line buffer 275 and a vertical pixel averaging function 278, discussed below.

Note that display function 270 includes other functions which are not specifically shown. For example, a horizontal pixel averaging function may be provided.

Figure 3:
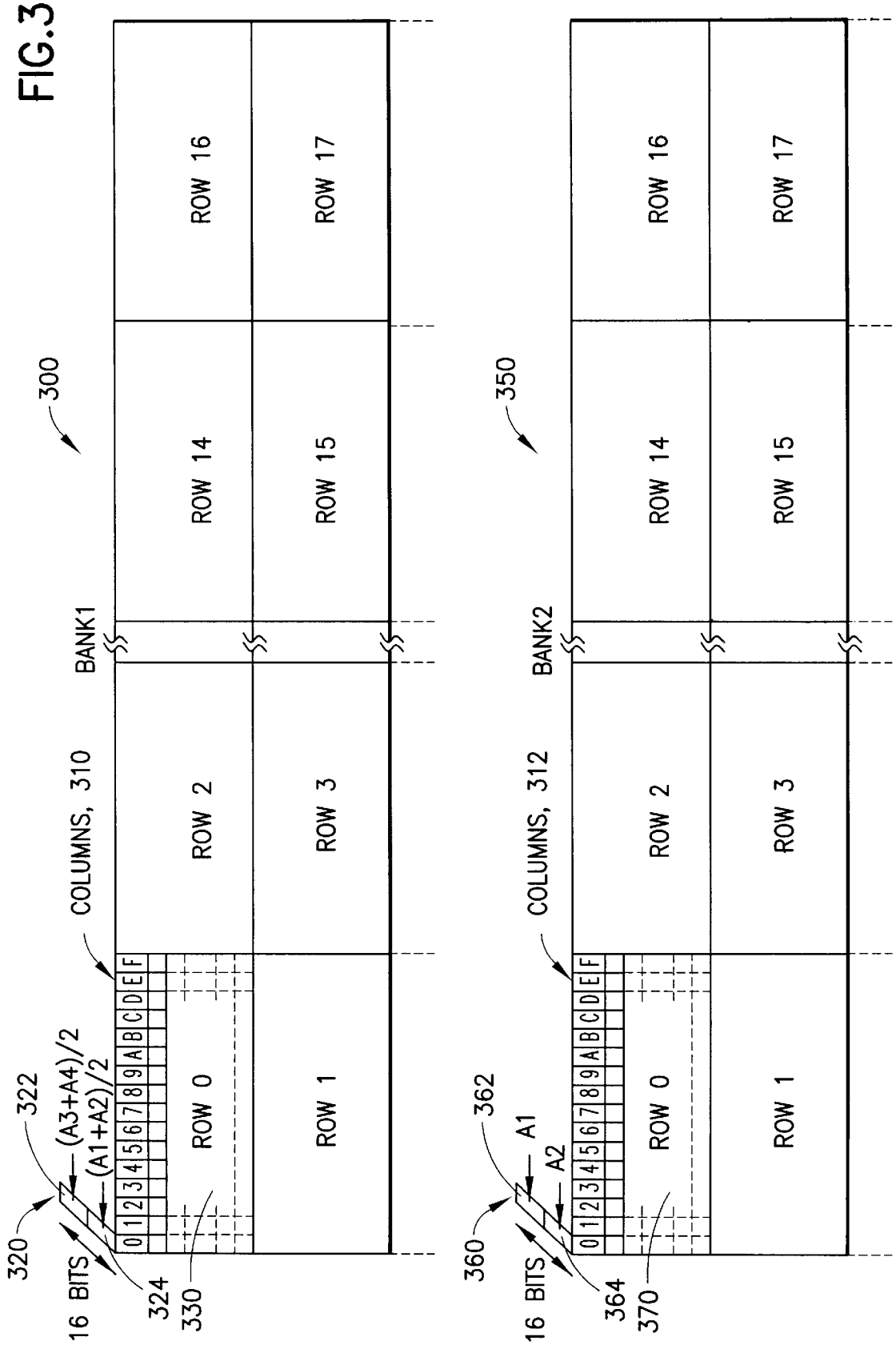
FIG. 3 illustrates a dual-bank memory storage configuration in accordance with the present invention.

FIG. 3 illustrates a dual-bank memory storage configuration in accordance with the present invention. The dual-bank memory 240 of FIG. 2 includes a first bank (BANK 1) 300 and a second bank (BANK 2) 350. Each bank is arranged in a number of memory rows, where each memory row has a number of addressable columns. For example, the first bank 300 includes a memory row 0 (330) having sixteen columns 310. Each memory space has a size of sixteen bits, for example, and can therefore accommodate two, eight-bit pixel values. For example, the memory space 320 can accommodate a first pixel value in the region 324 and a second pixel value in the region 322. In accordance with the present invention, the average of horizontal pixel pairs is stored in each region in the first bank 300. For example, the region 324 stores pixel data corresponding to the average of pixels A1 and A2, and the region 322 stores pixel data corresponding to the average of A3 and A4.

The second bank 350 is arranged analogously to the first bank 300, and includes a memory row 0 (370) with sixteen columns 312. A sixteen-bit memory location 360 includes storage regions 364 and 362. In accordance with the present invention, every other non-averaged pixel values of the original image that is output from the decompression engine 210 is also stored in the second bank. For example, the pixel value A2 is stored in the region 364, and the pixel value A4 is stored in the region 362, and so on. Alternatively, A1, A3, and so on, may be stored in the second bank 350

Note that while specific values are provided for the memory spaces and pixel word size in the illustrated embodiment, other values are meant to be encompassed by the invention.

The operation of the horizontal pixel reconstruction function 220 of FIG. 2 can now be understood by the following example. With the value (A1+A2)/2 stored in the region 324 of the first bank 300, and the pixel value A2 stored in the region 364 of the second bank 350, the pixel value A1 can be recovered by the relation A1=2*(A1+A2)/2-A2. Similarly, A3 may be recovered by retrieving the averaged value (A3+A4)/2 from region 322 of bank 300 and pixel A4 from region 362 of bank 350, and calculating A3=2*(A3+A4)/2-A4.

Alternatively, with A1, A3, and so on stored in the second bank 350, the pixel value A2 can be recovered by the relation A2=2*(A1+A2)/2-A1, the pixel value A4 can be recovered by the relation A4=2*(A3+A4)/2-A3, and so on.

Any known hardware, software and/or firmware may be used to perform the necessary calculations.

Therefore, since every other pixel of the original image, e.g., A2, A4, ..., is immediately available from the second bank 350, and the remaining alternate pixel values, e.g., A1, A3, ..., can be readily calculated as discussed, the horizontal pixel reconstruction function 320 can recover pixel data corresponding to the original, non-averaged image data.

Thus, by arranging the SDRAM data as discussed, a display downsizing feature can be implemented without additional processing speed or memory usage requirements. The horizontal downsizing is done at the decoding side before the data is stored in the frame buffers (e.g., memory 240). The horizontally downsized data is stored in one bank while every other pixel (i.e., every alternate pixel) of the original image is stored in the other bank, so decompression is still possible.

For display downsizing, the display process requires a data rate of 54 MHz for the SDRAM so that averaging in both the horizontal and vertical directions can be effectively achieved.

For display processing, only the first bank 300 is read to obtain a downsized image. Moreover, since only half of the line time is used to perform the horizontal downsizing, the rest of the line time can be used to pre-fetch the next line so that vertical downsizing can be performed. Vertical downsizing is performed by reading the horizontally downsized pixel data from the first bank 300 and performing averaging of vertically adjacent pixels. This can be understood by referring to FIGS. 1(b) and 1(c) where the horizontally and vertically downsized pixel data of line L1" is obtained by averaging the pixel data from the horizontally downsized lines L1' and L2' for respective vertically adjacent pixel pairs of the image 120. For example, in FIG. 1(b), (A1+A2)/2 and (A7+A8)/2 are a vertically adjacent pixel pair.

For prediction calculation at the decompression engine 210, the original, non-averaged pixel data is needed. By reading both memory banks, the necessary pixels are available with only a small loss due to round off errors for the averaged pixel data.

Referring to FIG. 2, the display function 270, with a line buffer 275, receives data from the memory 240 via single or dual-bank access. The line buffer 275 (or register file) receives the pixel data from the memory 240 pixel-by-pixel, and includes sufficient allocated space to store pixel data from one line plus one pixel, or word. In this manner, data from at least one vertically adjacent pixel pair from different lines is present in the line buffer 275.

A vertical pixel averaging function 278, such as a two-tap filter, may be provided in the display function 270, for averaging the pixel data from different lines as the data is output for display. Advantageously, the vertically averaged data need not be stored but is immediately displayed.

The display output from the display function 270, which may correspond to the CCIR standard, is provided to a conventional display device, such as a television. In a downsizing display mode, access to only a single bank of the memory is required. Specifically, access to the first bank 300 is performed to obtain the horizontally averaged pixel data as required. As discussed, vertical downsizing is achieved by averaging the horizontally downsized pixel data among adjacent pixel lines. For upsizing or full sizing, access to both banks of the memory 240 is required to recover the original, non-averaged pixel values. The display function 270 can perform processing similar to the horizontal pixel reconstruction function 220 as discussed previously to recover data corresponding to the original, non-averaged pixel values.

Figure 4:
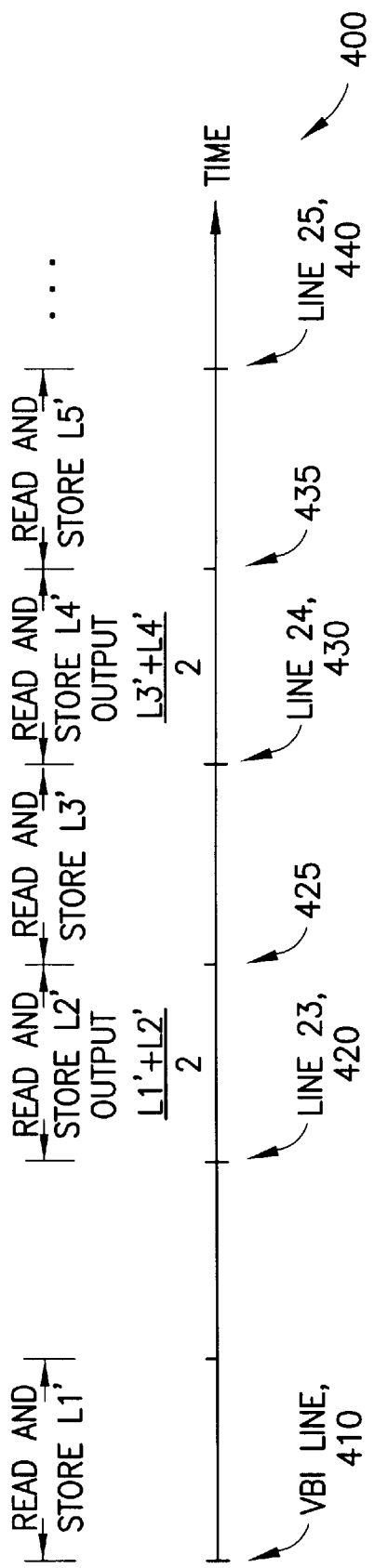
FIG. 4 illustrates a time line for processing data in accordance with the present invention.

FIG. 4 illustrates a time line, shown generally at 400, for processing data in accordance with the present invention. A Vertical Blanking Interval (VBI) line index 410, which may be the $22^{nd}$ line in a video image, signals the start of a time for reading pixel data from the horizontally downsized line L1' (see image 120 of FIG. 1(b)) from the first bank 300 of the memory 240 and storing it in the line buffer 275. The pixel data is read pixel-by-pixel (e.g., word-by-word). This activity can be completed within the time for displaying one half of a line of the original image since the line has been horizontally downsized by 2:1.

The start of the next line, line 23, begins at a time index 420. Between this time and the time indicated by index 425, the second line of horizontally downsized data, L2', is read from the first bank 300 and stored in the line buffer 275. Additionally, the average of pixel data from the first and second horizontally downsized lines, e.g., (L1'+L2')/2, is output from the line buffer 275 for display. As mentioned, data from one horizontally and vertically downsized pixel is output for display for each horizontally downsized pixel that is received at the line buffer.

In the time from index 425 to index 430, which signals the start of line 24, the third horizontally downsized line, L3', is read from the first bank 300 and stored in the line buffer 275.

In the time from the start of line 24, e.g., time index 430, to time index 435, the fourth horizontally downsized line, L4', is read from the first bank 300 and stored in the line buffer 275. Additionally, the average of the third and fourth lines, e.g., (L3'+L4')/2, is output from the line buffer 275 for display. In the time from index 435 to the start of line 25 at time index 440, a fifth horizontally downsized line of the original image, L5', is read and stored into the line buffer, and so forth.

An important feature with the present invention is the management of memory bandwidth. For example, if a two-tap filter is used in the vertical pixel averaging function 278 to average two lines for vertical downsizing, two lines of data (with no overlapping lines) must be read in from the memory 240 for every one line that is output and displayed from the display function 270. However, since the output line is already being cut by half (for 2:1 horizontal downsizing), we have that extra time to pre-fetch (e.g., read in) pixel data from the next line.

One-half of the decoded image is stored since the display image is reduced to one-half its original size, but the memory bandwidth remains the same. For example, assume a 704×480 image is being decoded and displayed as 352× 240, and that the user want the output image to be at the first quadrant of the display screen (e.g., upper-left). For B-frame, MPEG requires the display to immediately follow the decoding, i.e., as soon as an image is decoded, it must be displayed.

However, since the decoding rate is variable (e.g., due to the amount of data and complexity of different images), the best one can do is to decode the image ahead of time, e.g., about one-half frame before the image is to be displayed. Moreover, decoding is performed at the macroblock level, which covers both fields, while the display (e.g., using the CCIR 656 standard) is field-based. That is, field 1 is output first, then field 2, or vice-versa.

Thus, in one-half a frame time, the most that can be coded is about one-fourth of field 1 and one-forth of field 2. Hence, the display is constant and thus will catch up to the decoding, and problems can occur. The solution is to either increase the memory bandwidth or speed of the decoding, or allow the decoding to be way ahead of the display so the display will never catch up to the decoding. Thus, by storing the pixel data after only one-half of the image has been decoded (e.g., decompressed), the extra available space in the B-buffer can be used to allow the decoding to be further ahead of the display.

Accordingly, it can be seen that the present invention provides a system for downsizing a digital video image without extra memory or processing speed requirements. Horizontal averaging is performed on the decoding side, before storing the pixel data in memory, and vertical averaging is performed on the output side (e.g., or display side) after recovering the pixel data from memory and storing in a line buffer, and just prior to display. Moreover, the system can alternatively provide a full sized image as required for decompressing predictive-coded images.

Although the invention has been described in connection with various specific embodiments, those skilled in the art will appreciate that numerous adaptations and modifications may be made thereto without departing from the spirit and scope of the invention as set forth in the claims.

For example, while the invention was discussed in connection with a cable or satellite television broadband communication networks, it will be appreciated that other networks such as local area networks (LANs), metropolitan area networks (MANs), wide area networks (WANs), internets, intranets, and the Internet may be used.

Moreover, the invention may be adapted for use with other types of multi-bank memories besides SDRAM. The invention may also be adapted for use with multi-bank memories having more than two banks. Additionally, while a 54 MHz memory speed and 16 Mbit memory has been discussed for compatibility with MPEG-2 video decompression, the invention is meant to encompass other memory speeds and sizes.

Additionally, the invention is compatible with digital video standards other than MPEG-2.

What is claimed is:

1. A method for processing digital video data to display a downsized image thereof, comprising the steps of:

decompressing compressed digital video pixel data that is received from a channel to provide pixel data of an original image;

averaging horizontally adjacent pixel pairs of at least a portion of said original image to provide horizontally downsized pixel data;

storing said horizontally downsized pixel data in a first bank of a memory; and storing data from every other pixel of said at least a portion of said original image in a second bank of said memory.

2. The method of claim 1, comprising the further steps of:

retrieving said horizontally downsized pixel data from said first bank; and averaging data from vertically adjacent pixels of said horizontally downsized pixel data to[]provide vertically and horizontally downsized pixel data for display.

3. The method of claim 2, comprising the further steps of:

providing said retrieved horizontally downsized pixel data to a line buffer that is sized to store at least one line of said horizontally downsized pixel data, plus one pixel, prior to said averaging step.

4. The method of claim 1, wherein:

said memory comprises a Synchronous Dynamic Random Access Memory (SDRAM).

5. The method of claim 1, wherein:

said storing of said horizontally downsized pixel data and said data from every other pixel occurs no later than after one-half of said original image has been decompressed.

6. The method of claim 1, comprising the further steps of:

retrieving portions of said horizontally downsized pixel data from said first bank;

retrieving corresponding portions of said data from every other pixel from said second bank; and processing said retrieved portions and said retrieved corresponding portions to recover pixel data corresponding to said original image.

7. The method of claim 6, comprising the further step of:

providing said recovered pixel data of said original image for use in said decompressing step.

8. The method of claim 6, wherein said processing step comprises the step of:

calculating a difference between (a) twice a value of the respective retrieved portions and (b) a value of the respective retrieved corresponding portions, to recover said pixel data corresponding to said original image.

9. The method of claim 1, wherein:

said memory is a dual-bank memory.

10. An apparatus for processing digital video data to display a downsized image thereof, comprising:

a decompression engine for decompressing compressed digital video pixel data that is received from a channel to provide pixel data of an original image;

a horizontal pixel averaging function for averaging horizontally adjacent pixel pairs of at least a portion of said original image to provide horizontally downsized pixel data; and a memory, including a first bank for storing said horizontally downsized pixel data, and a second bank for storing data from every other pixel of said at least a portion of said original image.

11. The apparatus of claim 10, further comprising:

means for retrieving said horizontally downsized pixel data from said first bank; and a vertical pixel averaging function for averaging data from vertically adjacent pixels of said horizontally downsized pixel data to provide vertically and horizontally downsized pixel data for display.

12. The apparatus of claim 11, further comprising:

a line buffer that is sized to store at least one line of said horizontally downsized pixel data, plus one pixel;

wherein said line buffer receives said horizontally downsized pixel data from said first bank of said memory and provides vertically adjacent pixel pairs thereof to said vertical pixel averaging function for said averaging thereat.

13. The apparatus of claim 11, wherein:

said memory is a dual-bank memory.

14. The apparatus of claim 10, wherein:

said memory comprises a Synchronous Dynamic Random Access Memory (SDRAM).

15. The apparatus of claim 10, wherein:

said horizontally downsized pixel data and said data from every other pixel is stored in said memory no later than after one-half of said original image has been decompressed.

16. The apparatus of claim 10, further comprising a horizontal pixel reconstruction function for:

retrieving portions of said horizontally downsized pixel data from said first bank;

retrieving corresponding portions of said data from every other pixel from said second bank; and processing said retrieved portions and said retrieved corresponding portions to recover pixel data corresponding to said original image.

17. The apparatus of claim 16, further comprising:

means for providing said recovered pixel data of said original image for use by said decompression engine.

18. The apparatus of claim 16, wherein:

said horizontal pixel reconstruction function processes said retrieved portions and said retrieved corresponding portions by calculating a difference between (a) twice a value of the respective retrieved portions and (b) a value of the respective retrieved corresponding portions, to recover said pixel data corresponding to said original image.

* * * * *